Dec. 18, 1923.
R. BROWN
1,477,940
SIDE CUTTER FOR TRENCHING MACHINES
Filed April 12, 1923  2 Sheets-Sheet 2
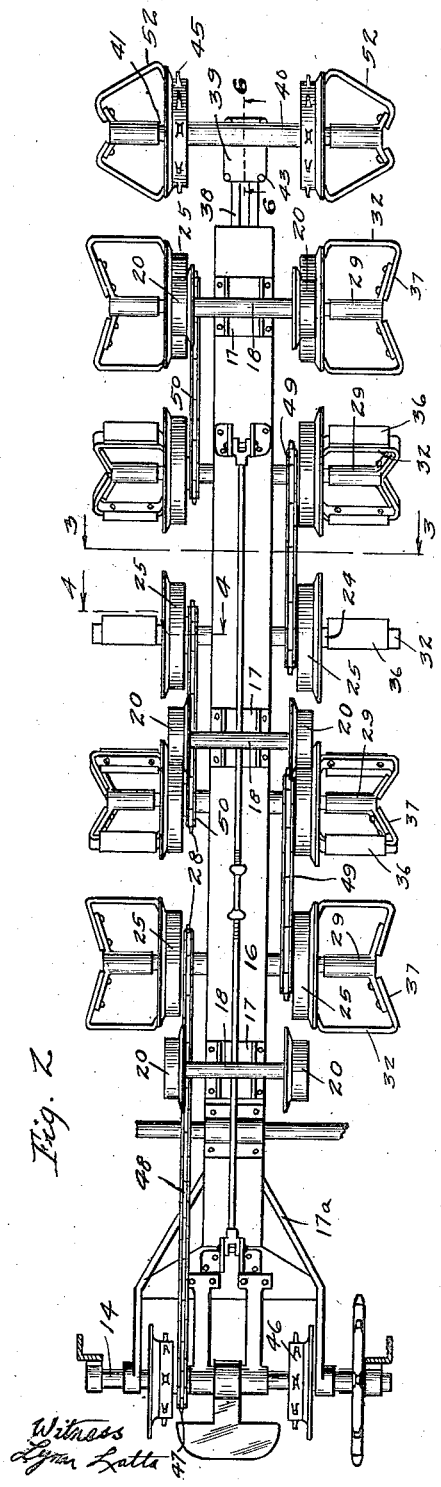
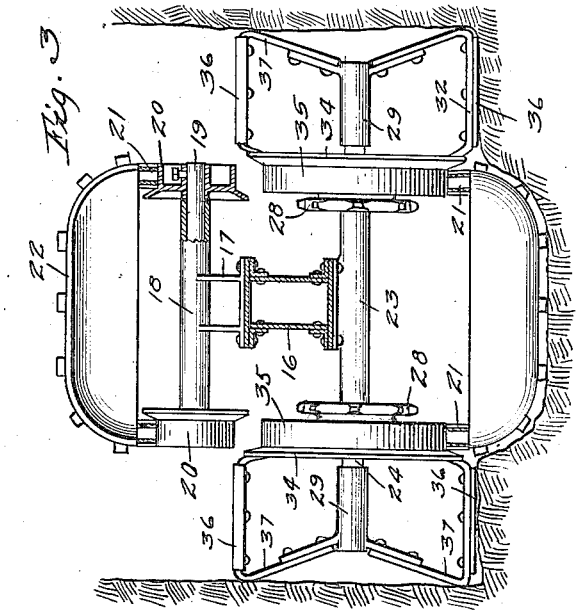
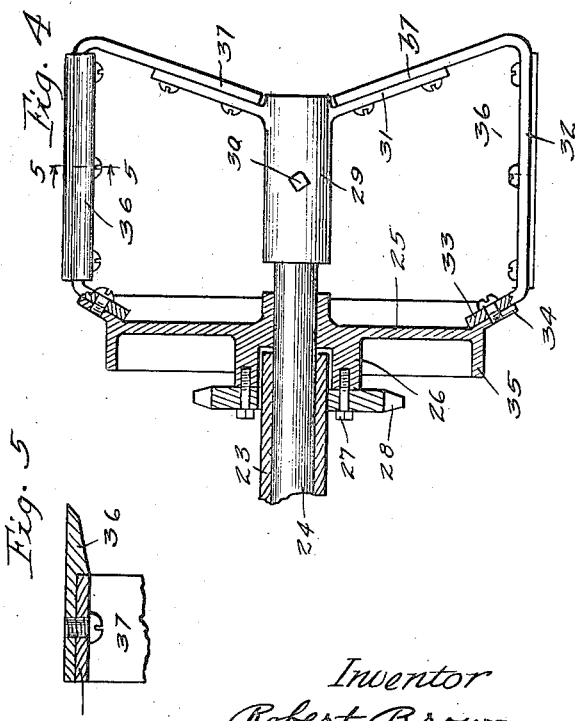
Inventor
Robert Brown
By Bair & Freeman
Att'ys Patented Dec. 18, 1923.

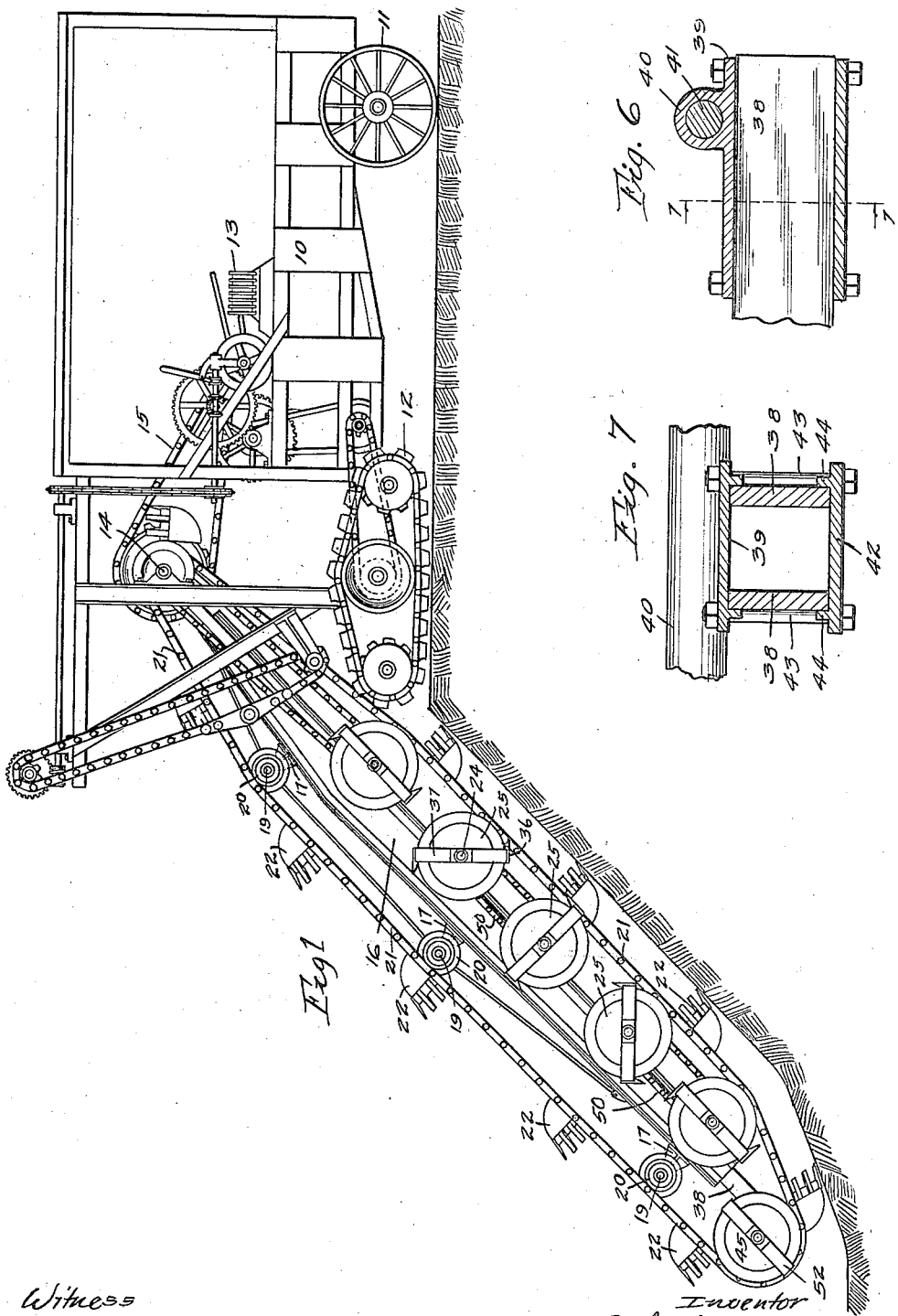

1,477,940

UNITED STATES PATENT OFFICE.

ROBERT BROWN, OF NEWTON, IOWA, ASSIGNOR TO THE PARSONS COMPANY, OF NEWTON, IOWA.

SIDE CUTTER FOR TRENCHING MACHINES.

Application filed April 12, 1923. Serial No. 631,616.

*To all whom it may concern:*

Be it known that I, ROBERT BROWN, a citizen of the United States, and a resident of Newton, in the county of Jasper and State of Iowa, have invented a certain new and useful Side Cutter for Trenching Machines, of which the following is a specification.

My invention relates to trenching machines and more particularly to a structure for cutting the sides of a ditch or trench for making a wider cut than can be done with the regular equipment of the machine.

A further object is to provide such a structure, which can be used in connection with the regular ditching mechanism as an attachment or otherwise and may be removed from the machine, when it is not desired to cut so wide a ditch.

A further object is to provide in such a side cutting structure novel cutting members.

With these and other objects in view, my invention consists in the construction, arrangement and combination of the various parts of my device, whereby the objects contemplated are attained, as hereinafter more fully set forth, pointed out in my claims, and illustrated in the accompanying drawings, in which:

Figure 1 shows a side elevation of a trenching machine having a side cutting structure embodying my invention.

Figure 2 shows a top or plan view of the boom and side cutting structure.

Figure 3 shows a transverse, detail, sectional view, somewhat enlarged, taken on the line 3—3 of Figure 2.

Figure 4 shows a detail, sectional view taken on the line 4—4 of Figure 2.

Figure 5 shows a detail, sectional view taken on the line 5—5 of Figure 4.

Figure 6 shows a sectional view taken on the line 6—6 of Figure 2; and

Figure 7 shows a transverse, sectional view taken on the line 7—7 of Figure 6.

In the accompanying drawings, I have used the reference numeral 10 to indicate generally the main frame of my improved trenching machine, having the front supporting wheels 11 and the rear traction devices 12, which may be of the endless tread type.

Mounted on the frame is a power plant 13.

At the rear of the frame is a transverse, driving shaft 14 operated from the power plant through suitable gearing mechanism 15.

The boom 16, which carries the digging mechanism, has at its upper end bifurcated arms 17$^a$, pivoted on the shaft 14, as shown in Figure 2.

On the upper side of the boom 16 are brackets 17, which support sleeves 18 in which are mounted shafts 19 on which are additional guide pulleys 20 for the chains 21 of the regular digging mechanism.

These chains carry the buckets 22, which are the regular equipment of my trenching machine.

Mounted on the underside of the boom 16 is a series of sleeves 23. When the side cutter attachment is used, shafts 24 are mounted in the sleeves 23.

Rotatably mounted near the outer ends of the shafts 24 are spiders or the like 25, which have hubs 26 receiving the outer ends of the sleeves 23.

Detachably connected with the hubs 26 by means of bolts 27 are sprocket wheels 28. On the outer ends of the shafts 24 are mounted sleeves 29 which may be locked to the shafts by means of set screws 30 or other means, and which have at their outer ends opposite arms 31 inclined away from the sleeves 29, as shown in Figure 4.

Cutter blade supporting brackets 32 are arranged spaced from the sleeves 29 on opposite sides thereof, and have at their inner ends inclined arms 33 detachably mounted on the inclined flange 34 at the periphery of the spider 25.

Each spider 25 has a drum or the like 35 under which the lower stretches of the chains 21 travel.

Detachably mounted on the brackets 32 are the cutter blades or teeth 36. At the outer ends of the brackets 32 are arms 37 inclined to position parallel with the brackets 32 and detachably secured thereto by bolt screws or the like.

At the lower end of the boom, the frame members 38 project therefrom.

Resting on top of the frame members 38 is a plate 39 on which is formed a journal 40 having a transverse shaft 41. Below the frame members 38 is a plate 42 secured to the plate 39 by means of bolts 43. The plates 39 and 42 have flanges 44 overlapping the frame members 38.

On the outer ends of the shaft 41 are mounted spiders 25, similar to those already described, having the flanges 34. Instead of the drums 35, the last-named spiders have sprocket wheels 45.

The chains 21 carrying the buckets 22 are extended over sprockets 46 on the shaft 14 and over the guide rollers 20 and the sprockets 45 and under the drums 35.

On the shaft 14 is a sprocket 47 in line with one of the sprockets 28 on the upper shaft 24 and on the last-described sprocket travels a chain 48. A chain 49 travels on the other sprocket on the upper shaft 24 and the aligned sprocket on the next lower shaft 24. A chain 50 travels on the sprocket at the opposite end of said next lower shaft 24 and over the aligned sprocket 28 on the next shaft 24 below it and so on.

In the practical use of my improved machine, the central part of the ditch is cut and the dirt carried out by the buckets 22, and, if desired, additional cutters mounted on the chains 21.

The sides of the ditch are cut by the cutters 36 and the cutters 52 on the shaft 41.

When the side cutting attachment structure is not employed, shorter shafts are substituted for the shafts 24 and the brackets 32 and the parts supported therefrom are left off the machine.

Some changes may be made in the structure and arrangement of the various parts of my improved side cutting structure without departing from the spirit of my invention, and I desire to cover by my patent, any modified forms of structure or use of mechanical equivalents, which may be reasonably included within the scope of my claims.

I claim as my invention:

1. In a machine of the class described, a frame, a drive shaft thereon, a boom pivoted on said drive shaft, a journal at the free end of the boom, a shaft in said journal, sprockets on said shafts, a chain and bucket excavating mechanism arranged to travel on said sprockets, a plurality of shafts on said boom, all of said shafts except the drive shaft being removable for substituting other shafts of different lengths, detachable cutter devices on the ends of said plurality of shafts, and means for driving said plurality of shafts successively from the drive shaft and from each other.

2. In a machine of the class described, a frame, a drive shaft thereon, a boom pivoted on said drive shaft, a journal at the free end of the boom, a shaft in said journal, sprockets on said shafts, a chain and bucket excavating mechanism arranged to travel on said sprockets, a plurality of shafts on said boom, all of said shafts except the drive shaft being removable for substituting other shafts of different lengths, detachable cutter devices on the ends of said plurality of shafts, comprising spiders, supporting brackets having inclined ends, secured to said spiders, sleeves on the plurality of shafts having inclined arms, arms on the brackets secured to the last arms, and cutters on said brackets.

3. In a machine of the class described, a frame, a drive shaft thereon, a boom pivoted on said drive shaft, a journal at the free end of the boom, a shaft in said journal, sprockets on said shafts, a chain and bucket excavating mechanism arranged to travel on said sprockets, a plurality of shafts on said boom, detachable cutter devices on the ends of said plurality of shafts, and means for driving said plurality of shafts successively from the drive shaft and from each other.

4. In a machine of the class described, a frame, a drive shaft thereon, a boom pivoted on said drive shaft, a journal at the free end of the boom, a shaft in said journal, sprockets on said shafts, a chain and bucket excavating mechanism arranged to travel on said sprockets, a plurality of shafts on said boom, detachable cutter devices on the ends of said plurality of shafts, comprising spiders, supporting brackets having inclined ends, secured to said spiders, sleeves on the plurality of shafts having inclined arms, arms on the brackets secured to the last arms, and cutters on said brackets.

5. In a machine of the class described, a side cutter structure comprising a frame element, a shaft thereon, a spider on said shaft, a sleeve on said shaft having an inclined arm, a bracket having arms secured to said spider and the arm on the sleeve, and a cutter on said bracket.

6. In a machine of the class described, a frame, a shaft thereon, a boom pivoted at one end on the shaft, a chain and bucket trenching mechanism supported on said boom, idlers on said boom for supporting said chain and bucket mechanism, means for imparting movement from said shaft to said trenching mechanism, a plurality of transversely mounted shafts on the boom, side cutter devices mounted on the ends of said transverse shafts comprising supporting brackets having inclined ends, cutters on said brackets, sleeves on the ends of said transverse shaft secured to the arms of said brackets.

Des Moines, Iowa, March 2, 1923.

ROBERT BROWN.